Patented Mar. 22, 1938

2,111,913

UNITED STATES PATENT OFFICE 2,111,913

MANUFACTURE OF SULPHANILAMIDE

Jonas Kamlet, Brooklyn, N. Y.

No Drawing. Application June 25, 1937,
Serial No. 150,340

6 Claims. (Cl. 260—130.5)

My present invention relates to a new process for the manufacture of sulphanilamide and, more specifically, to a process by which sulphanilamide, or p-aminobenzene sulphonamide, may be manufactured from cheap and readily available raw materials, such as the by-products from the manufacture of saccharin.

In 1935, Domagk (Deutsch. Med. Wochsch.: 61, 250, 1935) described the remarkable protection afforded to mice infected with virulent strains of hemolytic streptococci by injections of azo dyes containing the sulphonamide group para to the azo linkage. However, Colebrook, Buttle, Camb, O'Meara and Kenny (Lancet, 2, 1319, 1323, Dec. 5, 1936) found that these dyes have no inhibiting or bacteriostatic activity on hemolytic streptococci in vitro. By reduction with magnesium powder in vacuo, or with sodium formaldehyde sulphoxylate (Long and Bliss, Journal of the American Medical Association, vol. 108, No. 1, pg. 33), these azo dyes acquired an inhibitory effect in vitro comparable to that of the compound p-aminobenzene sulphonamide, hereinafter referred to as sulphanilamide. They concluded, therefore, as did Trefouel, Nitti and Bovet (Comptes rendus Soc. Biol. 120, 756, 1935) that these azo sulphonamide dyes have no activity per se but are similarly reduced in vivo to the chemotherapeutically active principle, sulphanilamide.

Numerous subsequent reports have confirmed this conclusion and, at the present time, sulphanilamide is being widely used for peroral and parenteral administration to humans in cases of hemolytic streptococcus conditions such as erysipelas, septicemia, puerperal sepsis, osteomyelitis of streptococcic origin, peritonitis, scarlatina, streptococcus meningitis, Ludwig's angina, otitis media, etc., as well as in pneumonia, especially where the causative organism is pneumococcus type III. A tremendous new field for the use of sulphanilamide has recently also been opened by the remarkable cures obtained with its use in the treatment of gonorrhea (Dees and Colston, Journal of the American Medical Association, vol. 108, No. 2, pg. 1855, 1937).

Heretofore, sulphanilamide has been manufactured exclusively by the process originally described by Gelmo (Journal fur Praktische Chemie, (2), vol. 77, pg. 372) or by minor modifications thereof. This process involves reacting N-acetyl- or N-benzyl-sulphanilic acid with phosphorus pentachloride, converting the resultant N-acetyl- or N-benzyl-sulphonyl chloride to the corresponding amide and subjecting the latter to an acid or alkaline hydrolysis, whereby sulphanilamide is obtained. The yields of this process are not satisfactory and the product obtained is usually contaminated by impurities and by-products, which are chemotherapeutically inactive.

I find that sulphanilamide may be obtained in an exceptionally pure state and in quantitative yield by submitting benzamide-p-sulphonamide to a Hofmann reaction. As is well known to all persons skilled in the art, the Hofmann reaction involves the conversion of compounds of the type $R.CONH_2$ to compounds of the type $R.NH_2$ (where R represents an alkyl or an aryl group) by reacting the former with a halogen in the presence of an excess of free alkali, or with the chemical equivalent thereof, an aqueous solution of an alkaline or alkaline earth hypohalite in the presence of free alkali. The reaction may be represented by the following equation:

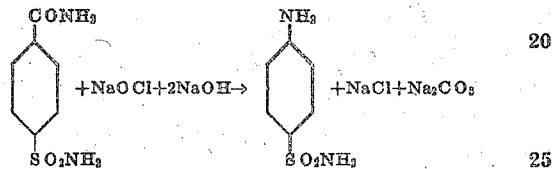

The conversion of benzamide-p-sulphonamide to sulphanilamide proceeds smoothly under the usual conditions of the Hofmann reaction. Thus, benzamide-p-sulphonamide (1 mol.) may be dissolved in aqueous caustic soda (2 mols) and sodium hypochlorite (1 mol.) added to the resultant solution. Alternatively, benzamide-p-sulphonamide (1 mol.) may be dissolved in aqueous caustic soda (4 mols) and chlorine gas (1 mol.) passed into the resultant solution. Alternatively, benzamide-p-sulphonamide (1 mol.) may be reacted with a solution of chlorine gas (1 mol.) in aqueous caustic soda (4 mols). On neutralizing the reaction mixtures in each case after the removal of all the available chlorine, a quantitative yield of sulphanilamide may be obtained. A single recrystallization from water yields a product suitable for human consumption.

It is not the purpose of this invention to limit the manufacture of sulphanilamide to benzamide-p-sulphonamide obtained from any specified raw materials. Obvious means of preparing this intermediate will occur to any person skilled in the art. However, the by-products obtained in the manufacture of saccharin may cheaply and simply be converted to benzamide-p-sulphonamide and are, therefore, of importance in this process.

German Patent #35,717 describes the preparation of benzamide-p-sulphonamide from benzoic-p-sulphonic acid, or a salt thereof, by reacting the latter with phosphorus pentachloride to form benzoyl chloride-p-sulphonylchloride, then with ammonia to form the diamide. Benzoic-p-sulphonic acid may readily be obtained by the oxidation of toluene-p-sulphonic acid or toluene-p-sulphonyl chloride (Remsen, Annalen, 178, 284, 290), by-products of the manufacture of saccharin.

German Patents #96,125 and #103,298 describe the preparation of benzamide-p-sulphonamide by the ammonolysis of ethyl benzoate-p-sulphonyl chloride. The latter may be obtained by ethylating benzoic-p-sulphonic acid and reacting the resultant ester with phosphorus pentachloride.

As a starting point in the synthesis of benzamide-p-sulphonamide, I prefer to use p-toluene sulphonamide. On oxidation (alkali dichromate in acid solution, alkali permanganate in acid or alkaline solution, alkali ferricyanide in alkaline solution) good yields of p-sulphonamidobenzoic acid are obtained (Remsen, Annalen, 178, 297). p-Sulphonamidobenzoic acid is then esterified in the usual manner, preferably by the use of an alkylating agent, such as a dialkyl sulphate, an alkyl halide, an alcohol in the presence of a condensing agent such as dry hydrochloric acid gas or a dehydrating agent such as concentrated sulphuric acid, etc.

Alkyl-p-sulphonamidobenzoate may be converted to benzamide-p-sulphonamide by ammonolysis. By reacting ethyl-p-sulphonamidobenzoate with an excess of dry ammonia gas at normal or increased pressure in an autoclave, a quantitative yield of benzamide-p-sulphonamide is obtained. By reacting ethyl-p-sulphonamidobenzoate with concentrated aqua ammonia at ordinary temperatures, benzamide-p-sulphonamide is obtained in yields of 65% to 85% of the theoretical, depending on the concentration of the ammonia and the reaction time. The remaining 15% to 35% of the ethyl-p-sulphonamidobenzoate is hydrolyzed to the ammonium salt of p-sulphonaminobenzoic acid, which is readily soluble in water and may thus be separated from the substantially insoluble benzamide-p-sulphonamide by filtration and returned to the process.

One of the difficulties encountered in the present processes of manufacturing saccharin is the separation of the para and the ortho isomers of the crude toluene sulphonyl chloride. If this separation is not attempted but the combined toluene sulphonamides are converted to the corresponding ethyl sulphonamidobenzoates, as described above, an excellent means is provided of obtaining both saccharin and benzamide-p-sulphonamide in a single operation.

The conversion of ethyl-o-sulphonamido-benzoate to saccharin by reaction with ammonia is rapid and quantitative (German Patent #103,298). The combined ethyl sulphonamidobenzoates are reacted with aqua ammonia, and the reaction mixture is then diluted and filtered from the insoluble benzamide-p-sulphonamide. The filtrate now contains the ammonium salts of saccharin and p-sulphonamidobenzoic acid in solution. These are separated by fractional precipitation with mineral acid, as described in German Patent #64,624. p-Sulphonamidobenzoic acid precipitates out first, is filtered off and returned to the process. Saccharin then precipitates out on further acidification, in good yield and in a state of great purity.

The following examples are intended to define and illustrate this invention but in no way limit it to the reagents, proportions or conditions described therein.

Example I 20.0 kgs. of benzamide-p-sulphonamide is dissolved in 160.0 liters of a 5% (7.3° Bé.) solution of caustic soda in the cold, and 55.0 liters of 14% sodium hypochlorite solution is added. The solution is then heated gradually to 40° C., and sulphur dioxide is passed into it until a negative reaction to potassium iodide-starch paper is obtained. The reaction mixture is then neutralized to phenolphthalein with 42° Bé. sulphuric acid, and the copious precipitate of sulphanilamide which forms on standing overnight is filtered off. After a single recrystallization from water, 15.8 to 16.4 kgs. of pure sulphanilamide is obtained (92% to 95% of the theoretical, based on the benzamide-p-sulphonamide consumed).

Example II 17.5 kgs. of technical p-toluene sulphonamide is suspended in a cold solution of 50.0 kgs. of potassium dichromate and 75.0 kgs. of 66° Bé. sulphuric acid in 125.0 liters of water. The mixture is warmed slightly and mixed until the reaction commences and the amide goes into solution. After a short time, separation of p-sulphonamidobenzoic acid commences and at the end of two hours, the entire reaction mixture is a thick magma. The heating is now discontinued, the reaction mixture is cooled to room temperature and filtered. The precipitate of p-sulphonamidobenzoic acid on the filter is then thoroughly washed until the washwater is free of chromium.

The filter cake of p-sulphonamidobenzoic acid is now dissolved in 80.0 liters of 5% (7.3° Bé.) solution of caustic soda and 15.4 kgs. of diethyl sulphate is added. The mixture is stirred until the diethyl sulphate has completely disappeared and for an hour thereafter.

The precipitate of ethyl-p-sulphonamidobenzoate is now filtered off and added to 50.0 liters of 27° Bé. aqua ammonia. After standing for 24 hours at room temperature, 100.0 liters of water is added, and the precipitated benzamide-p-sulphonamide is filtered off. On acidifying the filtrate with 42° Bé. sulphuric acid, p-sulphonamidobenzoic acid is precipitated, filtered off, and returned to the process.

The benzamide-p-sulphonamide thus obtained is converted to sulphanilamide as described in Example I.

Example III 22.0 kgs. of technical p-toluene sulphonamide is dissolved in 12.5 kg. of 38% (35.2° Bé.) caustic soda and 60.0 liters of water at a temperature not exceeding 35° C., and 40.0 kg. of potassium permanganate is added to the solution, with constant stirring in the course of three to four hours. The temperature should not be allowed to rise above 35° C. during the addition of the permanganate. Stirring is continued for three hours after all the permanganate has been added and the reaction mixture is then filtered or centrifuged. The precipitate of manganese dioxide is washed with 50.0 liters of water and the filtrate and wash water are combined.

42° Bé. sulphuric acid is added to the combined solution until the reaction is faintly acid to Congo red. About 5.0 kgs. of unchanged p-toluene sulphonamide is precipitated, filtered off and returned to the process. To the filtrate is added 15.4 kgs. of diethyl sulphate. The mixture is stirred until the diethyl sulphate has completely disappeared and for an hour thereafter.

The precipitate of ethyl-p-sulphonamidobenzoate thus obtained is converted to benzamide-p-sulphonamide as described in Example II.

Example IV 10.0 kgs. of toluene is added in the course of four hours to 15.0 kgs. of chlorsulphonic acid at −5° C. The mixture is then stirred for two hours at −5° to −10° C. and poured on 10.0 kgs. of ice and 10.0 kgs. of water.

The resultant mixture of 10.0 kgs. of o-toluene sulphonylchloride and 7.5 kgs. of p-toluene sulphonyl chloride is decanted from the aqueous layer and added to 15.0 kgs. of 27° Bé. aqua ammonia in the course of four hours. The mixture is stirred at a temperature of 30°-35° C. for two hours, washed free of ammonium chloride with 5.0 liters of water and filtered. There is thus obtained about 14.0 kgs. of a mixture containing 57% of o-toluene sulphonamide and 43% of p-toluene sulphonamide.

17.5 kgs. of the mixture of toluene sulphonamides is treated as described in Example II. The filtrate from the precipitate of benzamide-p-sulphonamide is fractionally precipitated with 42° Bé. sulphuric acid as described in German Patent #64,624. p-Sulphonamidobenzoic acid is precipitated first, filtered off and returned to the process. On further acidification, saccharin is precipitated.

The benzamide-p-sulphonamide thus obtained is converted to sulphanilamide as described in Example I.

From 100.0 kgs. of mixed toluene sulphonamides, the yields are 50.7 kgs. of saccharin and 31.4 kgs. of sulphanilamide.

In the preceding examples, the amount used of alkylating agent, e. g. diethyl sulphate, may be decreased to substantially half of that indicated by increasing the reaction time and temperature.

Having described my invention, what I claim and desire to protect by Letters Patent is:

1. A process for the manufacture of sulphanilamide which comprises submitting benzamide-p-sulphonamide to a Hofmann reaction.

2. A process for the manufacture of sulphanilamide which comprises reacting benzamide-p-sulphonamide with a halogen in the presence of alkali metal hydroxide.

3. A process for the manufacture of sulphanilamide which comprises reacting benzamide-p-sulphonamide with an alkali metal hypohalite in the presence of an alkali metal hydroxide.

4. A process for the manufacture of sulphanilamide which comprises reacting an ester of p-sulphonamidobenzoic acid with ammonia and submitting the resultant benzamide-p-sulphonamide to a Hofmann reaction.

5. A process for the manufacture of sulphanilamide which comprises reacting ethyl-p-sulphonamidobenzoate with ammonia and submitting the resultant benzamide-p-sulphonamide to a Hofmann reaction.

6. As a step in a process for the manufacture of sulpanilamide, the ammonolysis of an ester of p-sulphonamidobenzoic acid.

JONAS KAMLET.